(12) United States Patent
Shuler et al.

(10) Patent No.: US 9,223,633 B2
(45) Date of Patent: Dec. 29, 2015

(54) SINGLE PROCESSOR CLASS-3 ELECTRONIC FLIGHT BAG

(75) Inventors: Jason Shuler, Menomonee Falls, WI (US); Jonathan Schaaf, Brown Deer, WI (US); Andrew Lindgren, Wauwatosa, WI (US); Micah Fedke, Milwaukee, WI (US); Peter Schotz, Franksville, WI (US); David Owczarski, Cudahy, WI (US); Ram Gupta, Jackson, WI (US); Liya Chernyakova, Milwaukee, WI (US); Eugene Zobachev, Shorewood, WI (US); Nicholas Holupchinski, Milwaukee, WI (US); Stephen Chula, West Allis, WI (US); Matthew Hungerford, Waukesha, WI (US); Jeffrey Hering, Oak Creek, WI (US); David Jones, Glendale, WI (US); Bernard Newman, Mequon, WI (US); John Lehsten, New Berlin, WI (US)

(73) Assignee: Astronautics Corporation of America, Milwaukee, WI (US)

(*) Notice: Subject to any disclaimer, the term of this patent is extended or adjusted under 35 U.S.C. 154(b) by 112 days.

(21) Appl. No.: 13/120,372

(22) PCT Filed: Feb. 23, 2011

(86) PCT No.: PCT/US2011/025866
§ 371 (c)(1),
(2), (4) Date: Mar. 22, 2011

(87) PCT Pub. No.: WO2011/106379
PCT Pub. Date: Sep. 1, 2011

(65) Prior Publication Data
US 2011/0238239 A1    Sep. 29, 2011

Related U.S. Application Data

(60) Provisional application No. 61/307,012, filed on Feb. 23, 2010.

(51) Int. Cl.
*G06F 9/50* (2006.01)

(52) U.S. Cl.
CPC ............. *G06F 9/5077* (2013.01); *Y02B 60/142* (2013.01); *Y02B 60/167* (2013.01)

(58) Field of Classification Search
CPC ................... G09G 2360/12; G09G 2360/121; G09G 2360/18; G09G 2380/12
USPC ..................... 701/3, 4, 200; 709/214; 710/56; 711/158, 163, 170, 173, 103, 135; 718/4, 104; 345/534, 545; 370/235; 715/764, 766, 790, 791, 794
See application file for complete search history.

(56) References Cited

U.S. PATENT DOCUMENTS 5,577,212 A * 11/1996 Russ .............................. 709/214
5,987,494 A * 11/1999 Ouchi ........................... 718/107
(Continued)

FOREIGN PATENT DOCUMENTS

WO    WO 01/42932        6/2001
WO    WO 01/42932 A1 *  6/2001

OTHER PUBLICATIONS

Cisco Systems Inc.; Cisco IOS Firewall Overview; http://web.archive.org/web/20081012043919/http://www.cisco.com/en/US/docs/ios/12_1/security/configuration/guide/scdfirwl.html.*
(Continued)

*Primary Examiner* — Fadey Jabr
*Assistant Examiner* — Aaron L Troost
(74) *Attorney, Agent, or Firm* — Boyle Fredrickson, S.C.

(57) ABSTRACT

An electronic flight bag providing computational services for an aircraft and communicating with aircraft avionics may execute aircraft-design-approved Type-C applications together with non-design-approved Type-A/B on a single processor through specific modifications of the operating system to control memory and processor access thereby providing isolation comparable to that of dual processor systems in which the Type-C applications and Type-A/B applications are executed on different processors.

22 Claims, 7 Drawing Sheets

(56) References Cited

U.S. PATENT DOCUMENTS

| | | | |
|---|---|---|---|
| 6,829,662 B2* | 12/2004 | King-Smith et al. | 710/56 |
| 7,299,468 B2* | 11/2007 | Casey et al. | 718/104 |
| 8,194,088 B1* | 6/2012 | Paquette | G06T 11/40 345/536 |
| 2007/0134069 A1 | 6/2007 | Smith et al. | |
| 2007/0169125 A1* | 7/2007 | Qin | 718/102 |
| 2007/0186063 A1* | 8/2007 | Mogi et al. | 711/158 |
| 2008/0010426 A1* | 1/2008 | Yamamoto et al. | 711/163 |
| 2008/0010608 A1* | 1/2008 | Adams | G06F 3/1454 715/781 |
| 2008/0208399 A1* | 8/2008 | Pham | G01C 23/00 701/4 |
| 2008/0297525 A1* | 12/2008 | Rai | 345/534 |
| 2009/0010162 A1* | 1/2009 | Bergamasco et al. | 370/235 |
| 2009/0024311 A1* | 1/2009 | Hess | 701/200 |
| 2009/0037686 A1 | 2/2009 | Mendonca | |
| 2009/0049449 A1* | 2/2009 | Varadarajan | 718/104 |
| 2010/0262318 A1* | 10/2010 | Ariens | G01C 21/00 701/3 |

OTHER PUBLICATIONS

Cisco Systems Inc.; Cisco IOS Firewall Overview; http://web.archive.org/web/20081012043919/http://www.cisco.com/en/US/docs/ios/12_1/security/configuration/guide/scdfirwl.ht ml.*

Cisco Systems Inc.; Cisco IOS Firewall Overview; http://web.archive.org/web/20081012043919/http://www.cisco.com/en/US/docs/ios/12 1/security/configuration/guide/scdfirwl.ht ml.*

Dewyn, Torkild, PCT International Search Report and Written Opinion of the International Searching Authority for PCT App. No. PCT/US2011/025866, Jun. 8, 2011, European Patent Office, Rijswijk, The Netherlands.

* cited by examiner

SINGLE PROCESSOR CLASS-3 ELECTRONIC FLIGHT BAG

CROSS-REFERENCE TO RELATED APPLICATION

This application claims the benefit of U.S. provisional application No. 61/307,012 filed Feb. 23, 2010, and PCT Application PCT/US2011/025866, filed Feb. 23, 2011, the disclosures of which are incorporated herein by reference.

BACKGROUND OF THE INVENTION

The present invention relates to Electronic Flight Bags (EFBs) providing auxiliary computer functions in aircraft, and in particular, to Class-3 EFBs permanently installed in the aircraft and suitable for hosting and executing Type A, B and C applications concurrently.

EFBs are computer systems designed to allow the flight crew to perform flight management tasks more easily, efficiently and with less paper. The EFB's general computing platform is intended to reduce or replace paper reference material such as aircraft operating manuals, navigational charts and other items traditionally required to be brought on board the aircraft by the flight crew in the pilot's carry-on flight bag. In the United States, EFB devices are regulated by the Federal Aviation Administration (FAA) in accordance with Advisory Circular (AC) 120-76A and in Europe by the European Aviation Safety Agency (EASA) in accordance with Temporary Guidance Leaflet (TGL) 36, hereby incorporated by reference.

In many cases, the applications designed to provide data intended to replace paper reference and display it electronically on the EFB have been developed for use with Commercial-Off-The-Shelf (COTS) Operating Systems (OSes) and software components, for example, Microsoft Windows® OS with .NET framework components. Examples of these applications are document readers used to display manuals and reference documents, terminal chart viewers and electronic logbook applications.

As EFBs matured and grew in prevalence, the availability of an additional computer system with a display in the cockpit was exploited to provide additional functionality traditionally associated with primary flight display systems and multifunction displays. These include the display of avionics data related to the current state of the aircraft including position, orientation and flight planning. These additional functions in addition to the traditional functions of the EFB are divided into three application categories: Type A, B and C. Type A applications include fixed presentations of pre-composed data traditionally presented in paper format (electronic pilot manuals, reference documents, equipment lists, and maintenance manuals). Type B applications include interactive applications that can manipulate dynamic data and presentation (terminal charts, performance calculations, cabin video). Type C applications include items that are typically associated with the primary flight display and could have an impact on flight safety and crew workload. An example of Type C applications are an interactive moving map displaying ownship position or an application that interacts with an Automatic Dependent Surveillance-Broadcast (ADS-B) processor providing guidance for In-Trail Procedures or Merging and Spacing (M&S), hereby incorporated by reference.

Per AC-120-76A, Type C applications require Aircraft Certification Service (AIR) Design Approval with a rigor determined by the effects its failure has on crew safety and workload. Radio Technical Commission for Aeronautics (RTCA) publishes DO-178B "Software Considerations in Airborne Systems and Equipment Certification", an FAA accepted guidance for acquiring Design Approval for software used in avionics. RTCA, Inc, is a private, not for profit corporation based in Washington DC USA. DO-178B is one means, but not the only means, to gain design assurance approval from the FAA.

Per AC120-76A, the physical EFB hardware is classified into one of three classes based on installation and intended use. The classes are Class 1, 2 and 3. Class 1 EFBs are generally COTS-based systems, such as a laptop or tablet PC, that are portable and not attached to the aircraft. Class 2 EFBs are also generally COTS based systems and portable, but are connected to the aircraft during normal operations. Class-3 EFBs are installed avionics equipment and, unlike Class 1 and 2 EFBs, are required to meet the regulatory requirements pursuant to its intended function on the aircraft. RTCA, Inc publishes DO-160F "Environmental Conditions and Test Procedures for Airborne Equipment", one FAA approved accepted guidance for acquiring AIR Approval for hardware used in avionics, hereby incorporated by reference.

Type A and/or B (henceforth Type A/B) applications may be hosted on any Class of EFB and do not require Design Approval. Type C applications, however, do require Design Approval and can only be hosted on Class-3 EFBs, except in those situations where the application has a Technical Standard Order (TSO) and that other hosted applications on the Class 1 or Class 2 EFB have minor or no safety effect and do not interfere with the Type C application with a TSO.

When hosting Type A/B applications and Type C applications on a single Class-3 EFB, it is important to isolate the design approved Type C applications and aircraft interfaces from the Type A/B applications so that there are no adverse effects or interference to any safety critical components or software on the aircraft connected to or hosted on the EFB from Type A/B applications. A current method for isolating the design approved software and protecting the aircraft components connected to the EFB is to use two separate processors within a single EFB, one hosting a design approved operating system such as a custom Linux-based operating system and Type C applications and the other hosting a COTS operating system, such as the Windows® operating system manufactured by Microsoft Corporation of Washington USA. The circuitry connecting the two processors provides hardware control over the COTS operating system by the design approved operating system allowing it to control, monitor and restrict its operation to protect the aircraft interfaces connected to the EFB. The physical separation provided by the two separate processors provides sufficient isolation of Type C applications from Type A/B applications.

SUMMARY OF THE INVENTION

The present invention provides a Class-3 EFB (electronic flight bag) that may execute both Type-A/B and Type-C applications on a single processor thereby providing a substantial savings in weight, power consumption, and cost. By identifying a set of mechanisms by which a Type-A/B application may interfere with execution of a Type-C application, the present inventors have realized the effects of hardware isolation through modifications to the operating system limiting access to memory, processing, and display resources. These modifications permit single processor architecture with isolation equivalent to a multiple processor system.

Specifically, the present invention provides a Class-3 electronic flight bag having a single processor with at least one core and an electronic memory system communicating with the processor and holding an operating system. The electronic flight bag provides a network interface communicating with an aircraft data network to connect to other aircraft equipment including navigation systems and a display that communicates with the processor. The access of Type-A/B applications in the electronic memory system, to the electronic memory, the display, and the processor is limited according to predefined rules enforced by the operating system to block potential interference by an execution of the Type-A/B application with an execution of the Type-C application.

It is therefore a feature of at least one embodiment of the invention to provide the segregation between critical and noncritical applications executing on a single processor without the need for separate processors.

The operating system may limit the total size of socket buffers used for communication, for example, by limiting the total size of socket buffers to a predefined maximum data allocation per socket and limiting the total number of sockets to a predefined maximum number of sockets. As is generally understood in the art, socket buffers are storage areas in computer memory used for communication between processes being executed by the computer.

It is thus a feature of at least one embodiment of the invention to prevent excess socket buffer allocation by Type-A/B applications, such buffers typically being in the memory space of the operating system, from interfering with operating system operation.

The operating system may prohibit network broadcast messages.

It is thus a feature of at least one embodiment of the invention to ensure that messages are between defined specified endpoints that may be monitored to prevent spoofing.

The electronic memory system may include nonvolatile data storage and each application may be assigned to a partition having read and execute but not write permission It is thus a feature of at least one embodiment of the invention to prevent a Type-A/B application from changing data used by a Type-C application through disk overwriting.

The reservation of volatile data storage may be limited to a predefined maximum amount of storage per application. Each Type-A/B application may reserve volatile data storage only after all Type-C applications have reserved volatile data storage.

It is a further feature of at least one embodiment of the invention to prevent excess volatile memory used by a Type-A/B application from interfering with a Type-C application by denying volatile memory to the Type-C application.

The reservation of volatile data storage may be limited to a predefined total maximum amount of storage for all applications.

It is thus a feature of at least one embodiment of the invention to prevent system instabilities resulting from over allocation of volatile memory.

The operating system may enforce the predefined total maximum and a predefined per application maximum by loading registers in a memory management unit controlling access to the volatile data storage.

It is thus a feature of at least one embodiment of the invention to employ a memory management unit to enforce memory partitioning that is resistant to corruption by operation of a Type-A/B application. Access to the memory management unit settings can be limited to the operating system.

The operating system may control scheduling of the single processor for execution of different processes of the application programs and provide a limited maximum schedule percentage for each application program.

It is thus a feature of at least one embodiment of the invention to adopt a process scheduling algorithm resistant to being wholly usurped by an executing Type-A/B application.

The different processes of the applications may be queued for the single processor such that processes for Type-C applications are given priority in the queue.

It is thus a feature of at least one embodiment of the invention to ensure operation of the Type-C applications in a mixed environment of applications.

Processes may be placed lower in the queue when they historically use their full scheduled percentage as compared to when they historically do not use their full scheduled percentage.

It is thus a feature of at least one embodiment of the invention to prevent monopolization of the single processor by a particular application.

The electronic flight bag may further include peripheral devices having configuration registers and the first operating system may block access to these registers to Type-A/B applications.

It is thus a feature of at least one embodiment of the invention to prevent corruption of peripheral device operation by a Type-A/B application.

The electronic flight bag may further include a display system providing communication with the single processor to provide data to the display, the operating system managing a separate buffer for each of at least one Type-C and one Type-A/B application and selecting between the buffers by operating system control so that the Type-A/B application cannot write over data of the buffer for the Type-C.

It is thus a feature of at least one embodiment of the invention to prevent Type A/B applications from irreversibly destroying critical graphics output from a Type C application by writing over that output as can happen if a single buffer is used.

The separate buffers may be in memory locations uniquely writable by the different applications.

It is thus a feature of at least one embodiment of the invention to prevent video buffer overruns from preventing output of graphical data by Type-C applications.

The operating system may further execute on the single processor to provide data to the display. The operating system may then manage an application's video buffer receiving standard display data from an application and an overlay video buffer receiving higher priority display data from a Type-C application and may composite the contents of the buffers so that the application buffer cannot occlude data from the overlay buffer when displayed.

It is thus a feature of at least one embodiment of the invention to ensure critical graphic data is not occluded by a Type A/B application (or Type C application) somehow holding focus.

The buffers may be partitioned into functional areas and the display system may rearrange a relationship between buffer location and spatial locations on the display differently for different functional areas depending on an indicated orientation of the display.

It is thus a feature of at least one embodiment of the invention to provide sophisticated reformatting of the display depending on the display's orientation without the need to separately program two different display formats.

The electronic memory system may also hold a second operating system and the Type-A/B application may be executed by the second operating system by virtualization implemented by the first operating system. The first operating system, for example, may be a certified open-source operating system while the second operating system may be a proprietary operating system such as Windows®.

It is thus a feature of at least one embodiment of the invention to permit the use of Type-A/B applications executable only on a proprietary operating system that cannot be design approved, without jeopardizing the ability of the electronic flight bag to be used for design approved applications. The operating system segregation and virtualization compartmentalize the proprietary operating system so that errant behavior is contained.

These particular objects and advantages may apply to only some embodiments falling within the claims and thus do not define the scope of the invention.

DETAILED DESCRIPTION OF THE PREFERRED EMBODIMENT

Figure 1:
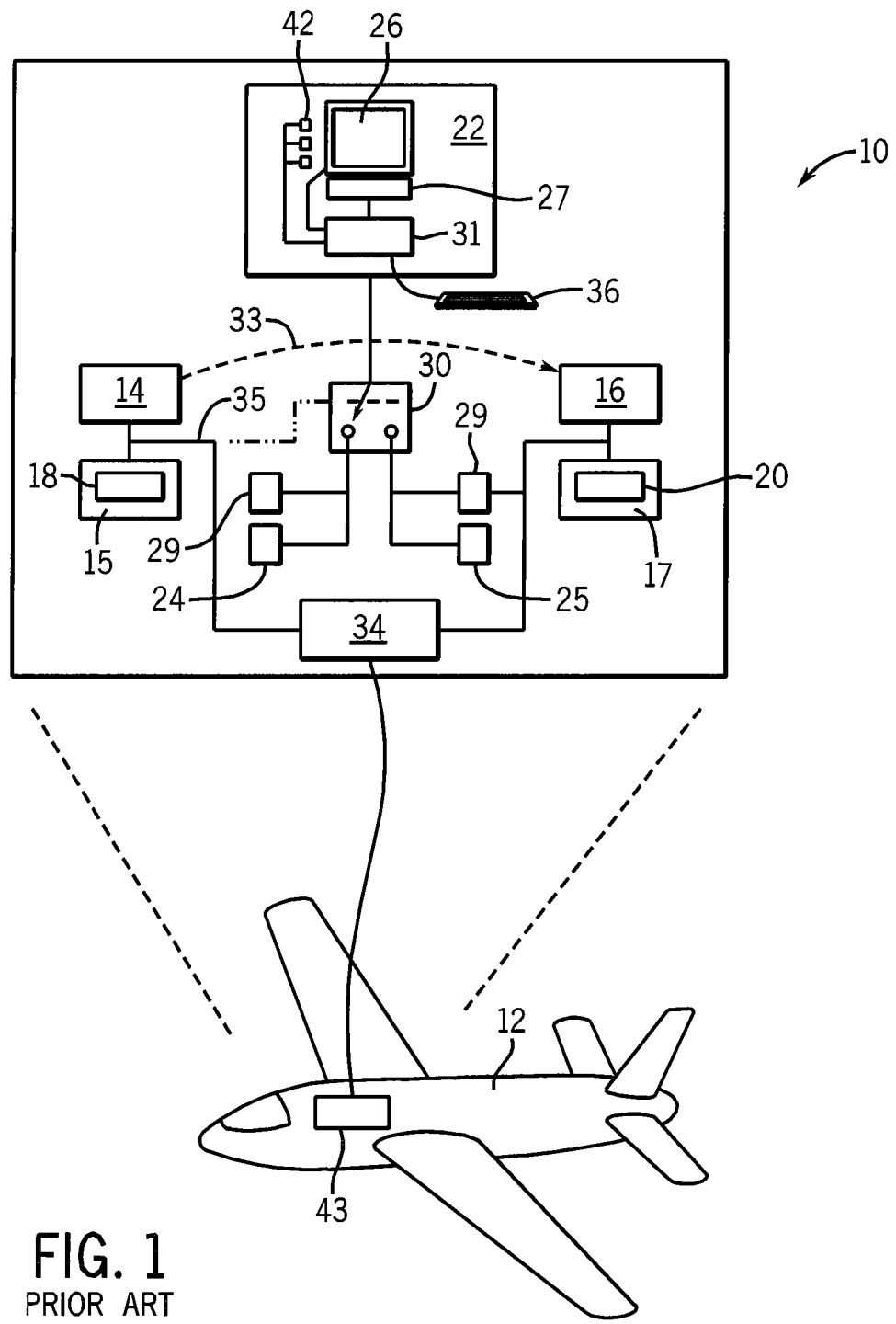
FIG. 1 is a hardware block diagram of a prior art EFB using separate processors to isolate applications.

Referring now to FIG. 1, a prior art EFB 10 for use in an aircraft 12 may include a first processor 14 and a second processor 16 communicating with a first and second memory 15 and 17 respectively. The first processor 14 may be used to host a first software application 18 held in the first memory 15 that may be, for example, a Type C software application. The second processor 16 may be used to host a second software application 20 held in the second memory 17 that that may be, for example, a Type A/B software application. The memories 15 and 17 may include hard drive units and flash memory to provide several forms of non-volatile memory.

The processors 14 and 16 may share a common display unit 22 having a single liquid crystal display (LCD) device 26. Each processor 14 and 16 may communicate with its own video controller, 24 and 25. The first processor 14 may communicate with the primary video controller 24 and the second processor 16 may communicate with the secondary video controller 25. The two video controllers 24 and 25 may communicate with the LCD device 26 through a system of Field Programmable Gate Arrays (FPGAs) acting as a video switching system 30. The FPGA switching system 30 may be under the control of a single processor, for example, the first processor 14 may have a primary device bus 35 connecting it to the switching system 30 so that it can control which processor, 14 or 16, is in transmitting on the video interface 31. Such a condition may develop when a need to display more critical flight or aircraft related information arises while the display unit 22 is being used to display less critical information being supplied by the second software application 20 running on the second processor 16. The switching system 30 may communicate with the LCD 26 via a display interface 31 providing signals to driver circuitry 27 of the LCD display 26 and receiving signals from buttons or an LCD touch screen 42. An external keyboard 36 may be connected to the display interface 31. The processors 14 and 16 may also communicate with a standard Ethernet network (not shown) for communicating with other devices such as aircraft cameras and the like as is understood in the art.

Each processor 14 and 16 may also communicate with its own input interface 29 receiving signals from buttons and LCD touch screen 42 or external keyboard 36.

Referring again to FIG. 1, it may be necessary to limit access to and visibility of avionics interfaces 43 to other avionics of the aircraft 12 due to safety related concerns. An I/O card 34 provides access to avionics interfaces 43 so that the EFB 10 can interact with other equipment installed on the aircraft 12. The I/O card 34 may consist of a microcontroller containing embedded software, supporting circuitry and circuitry designed to connect to avionics interfaces 43 of a type known in the art. Allowing the first processor 14 to initialize and configure the I/O card 34 enables the first processor 14 to restrict access to avionics interfaces 43 from the second processor 16. This ability allows the EFB 10 to meet necessary safety standards.

Under certain circumstances, it may be necessary for the first processor 14 to disable or reset the second processor 16; either due to malfunction of the second processor 16 or software failure of software 20. There may be a reset signal 33 from the first processor 14 to the second processor 16 that allows the first processor 14 to disable or reset the second processor 16. This ensures that the first processor 14 has complete control over the display unit 22 (via the switching system 30), as well as the second processor 16. This eliminates the need for costly certification of the second application to meet rigorous FAA standards governing the use of software applications on a Class-3 EFB in commercial aircraft 12. Thus, the second software application 20 may represent a commercial, off-the-shelf software application. Even if the second software application 20 is provided as a customized software application, there is still a significant advantage since the costly and rigorous certification required for Type-C applications is eliminated. This is because the first processor 14 is provided with the capability of completely wresting control of the display unit 22 and the second processor 16 as may be needed to display critical information, or to require an immediate operator response.

Figure 2:
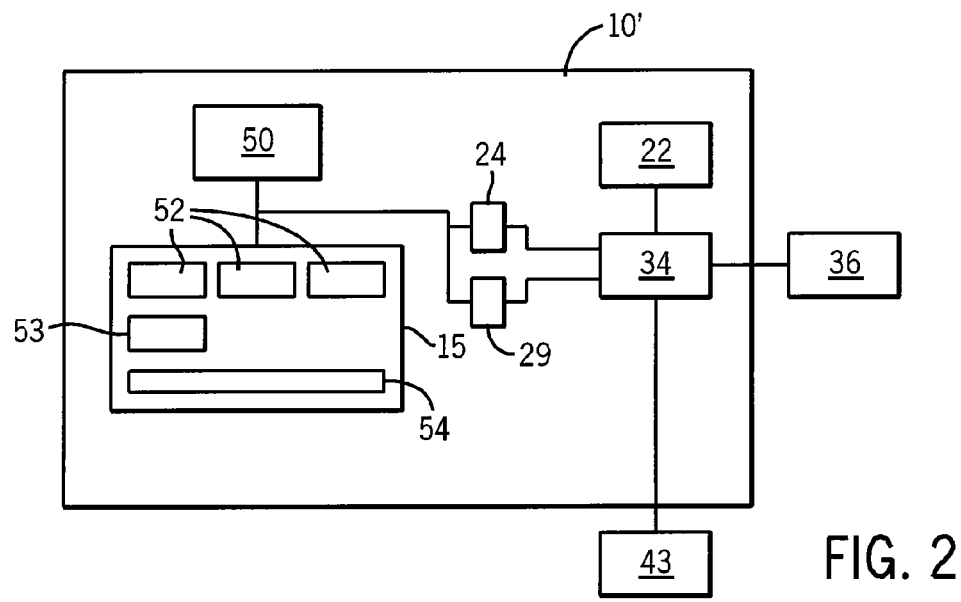
FIG. 2 is a hardware block diagram similar to that of FIG. 1 showing an EFB using a single processor per the present invention.

Referring now to FIG. 2, the present invention provides an EFB 10' in which the complexity of a two processor system and the hardware switches used to provide dominance of one processor over the other may be avoided in favor of a single processor 50. This single processor 50 executes multiple application programs 52 (Type-A, B or C applications) held in memory 15 using a specially modified operating system 54 as will be described below. The specially modified operating system 54 controls execution of all other software hosted on the EFB 10'. A main menu program 53 relating to the intrinsic operation of the EFB 10' may also be held in memory 15 and executed by the processor 50. For descriptive clarity, "operating system" as used herein will be considered to cover the operating system kernel in combination with additional root services, drivers and other software used generally by multiple applications and necessary for the execution of application programs.

In this architecture, the processor 50 may communicate with an interface 34 without the need for a switching system and the interface 34 may connect via a device bus 35 with various input devices 36 and 42, similar to those previously described. The interface 34 may also connect to avionics systems, including a navigational unit, via avionic interfaces 43. The processor 50 may also communicate with a video controller 24 having as little as a single graphic processor and data to the display unit 22 through interface 34. The processor 50 may also communicate with input interface 29 receiving signals from the buttons and touchscreen 42 and external keyboard 36, again through interface 34.

Figure 3:
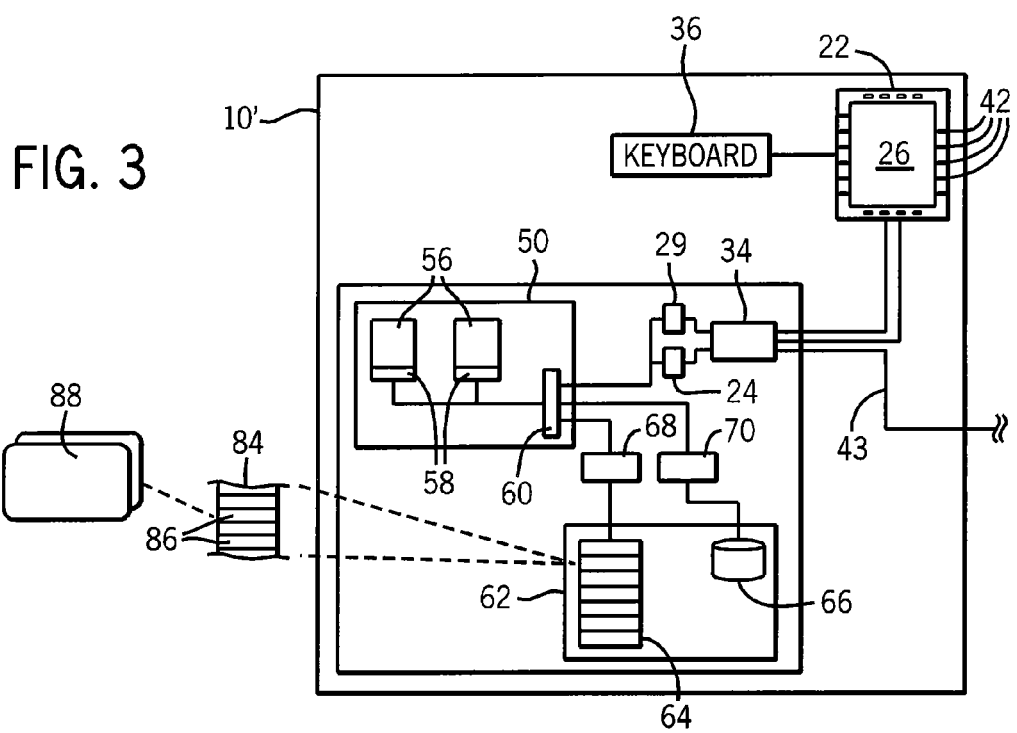
FIG. 3 is a functional block diagram of the EFB of FIG. 2 showing communication between memory systems and the single processor.

Referring now to FIG. 3, the processor 50 may, for example, be a processor having multiple cores 56 each, for example, with an L1 cache 58 and sharing an L2 cache 60. The L2 cache 60 may connect via one or more internal buses with random access volatile memory 64 and nonvolatile memory 66, the latter, for example, being logically a "disk" drive for example as realized by flash memory, both part of a memory system 62. Access to the volatile memory 64 may be via a memory management unit 68 and access to the nonvolatile memory 66 may be via a disk controller 70 of types well known in the art.

Figure 4:
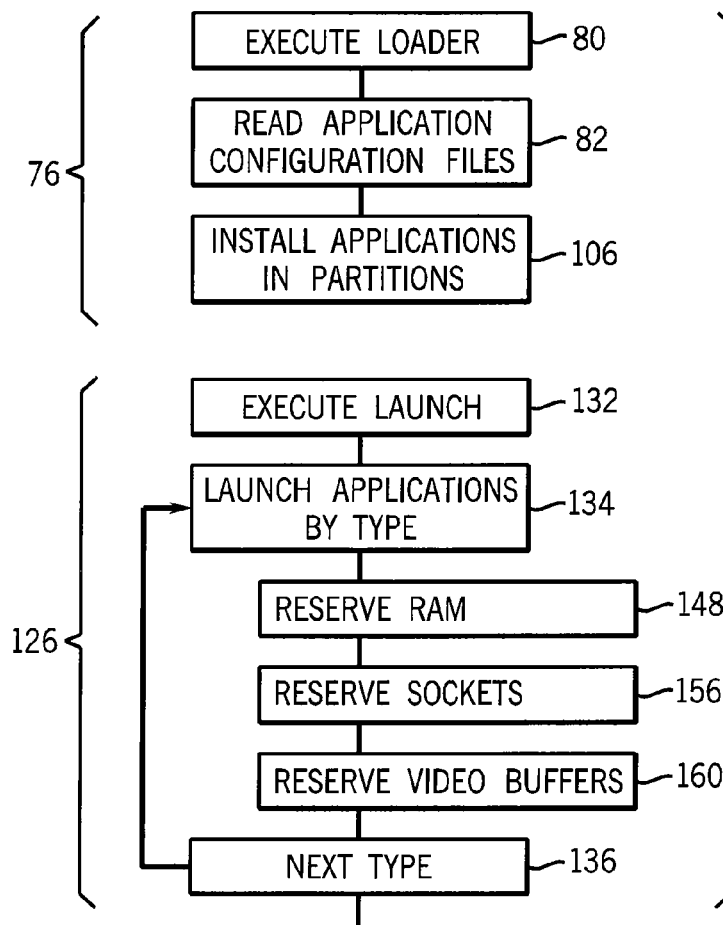
FIG. 4 is a flow chart showing loading and launch of the EFB of FIG. 2 and FIG. 3.

Referring now to FIG. 4, the processor 50 may execute a loading routine 76 before and at various times during the course of the use of the EFB 10' in the aircraft, the loading routine 76 used to install and configure the desired application programs. In a first step, indicated by process block 80, the loading routine 76 starts a loader program. Per process block 82, the loader program reviews identified application programs 52 to be used on the electronic flight bag 10' together with a configuration file 84 (as part of a manifest file) associated with the application programs 52 and identifying the application programs 52 as applications such as this will affect their placement in disk partitions.

Figure 5:
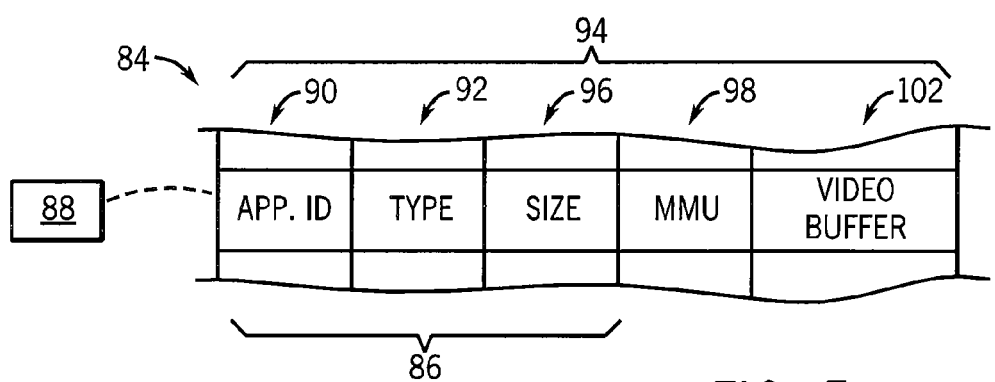
FIG. 5 is a representation of a configuration file and a configuration table for an application program executable on the EFB of FIG. 2 and FIG. 3 used for loading and launch.

Referring momentarily to FIGS. 3 and 5, the configuration file 84 may have entries 86 for each application program 52 linked to the application executable 88 for that application. The entry 86 for each configuration file 84 will generally provide an application identifier 90 identifying the executable 88 and its processes (for example with a group identifier), and an application type 92 (e.g. Type-A, Type-B, or Type-C) and will indicate an amount of memory to be reserved for the applications 96. The information from the configuration file 84 will be added to a configuration table 94 developed for that application program 52 at the time of launching of the operating system 54. The configuration table 94 will add additional information to be described below including memory management unit memory allocation information 98 defining a permissions group, video buffer information 102 associated with each application program 52 as will be discussed below.

Figure 10:
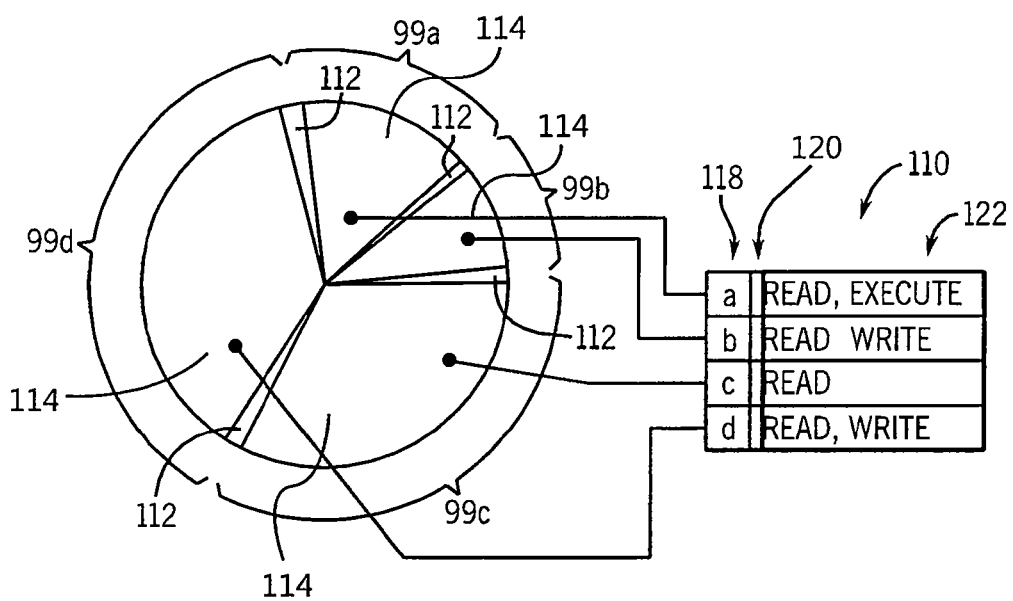
FIG. 10 is a representation of nonvolatile disk storage showing a partition table for the same.

Referring again to FIGS. 4 and 10, using the information obtained at process block 82, at process block 106, the application programs 52 are installed in the nonvolatile memory 66, into previously prepared partitions 99. The partitioning process allocates a separate disk partition 99a-d including a first disk partition 99a holding executables for the application programs (and also for operating system) which provides for only read access and execution of the files contained in this partition and not write access. A second partition 99b provides for read/write access but not execution and is used by the application programs for temporary files and logs. A third partition 99c provides read-only access and not for execution of the files contained in this partition and may be used for databases shared among applications. The fourth partition 99d holds programs available but not yet installed and is not executable and is read and write but only for the operating system. By placing the applications in the first disk partition 99, any errant applications may not write over the disk files of other applications. Each partition 99 is described in a partition table 110 as indicated generally by a row in a partition table 110. As understood in the art, a partition 99 will include its own file system 112 (mapping logical addresses to physical addresses on the disk) and its own storage area 114 mapping to a predetermined and limited physical address range 116 as implemented by the operating system and the encoding of information in the disk medium. The partition table 110 may provide a logical identifier 118 for each partition (here designated as a, b, c, d.), physical address information 120 for the file system 112, and data access permissions 122 indicating the application program 52 having permission to read or write to that particular partition. Other methods of partitioning for the implementation of access permissions are also contemplated by the invention.

Generally, each application program 52 will be loaded in its own unique folder in partition 99a and is provided with a "root jail" preventing it from seeing the portions of the file system 112 associated with other directories. "Loopback devices" of a type known in the art are used to allow given application programs access to only appropriate portions of the partitions 99b and 99c. By limiting the access to the disk controller hardware configuration registers and/or limiting the operating system calls available to the application programs, the disk controller hardware can provide a robust enforcement of the partitions preventing possibly errant application behavior in which one application writes over a second application or its data.

Referring again to FIG. 4, after at least one completion of the loading routine 76, the processor 50 may execute a launch routine 126 beginning at process block 132. This launch routine 126 is implemented by operating system 54 and moves the various application programs 52 into volatile memory 64 for execution. This launch process is again controlled by the configuration table 94 and, in particular, by the identification of each application program as to Type-A, B, or C. In a preferred embodiment, the launching process begins with Type-C applications and launches Type-A and Type-B applications only after all of the Type-C applications are launched per the loop bounded by process blocks 134 and 136.

Figure 6:
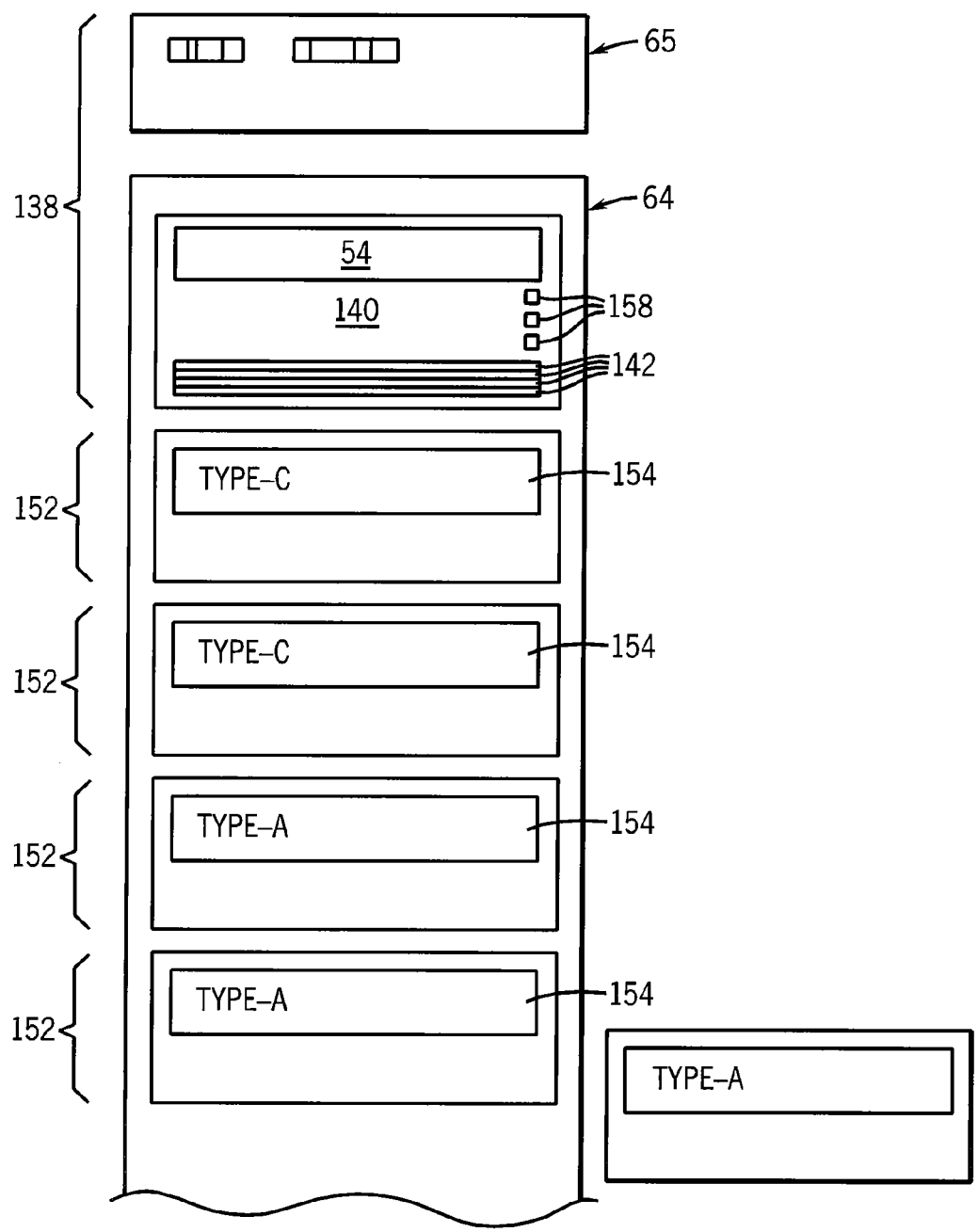
FIG. 6 is a detailed representation of the memory of FIG. 2 showing allocation of various data structures and files.

Referring also to FIG. 6, in the first steps of this launching process, volatile memory 64 for holding the executable files of the operating system 54 and the various application programs 52 is reserved by the operating system 54. This reserving may be enforced by a memory management unit 68 (shown in FIG. 1) by loading the control registers of the memory management unit 68 with data to control the mapping of logical addresses to physical addresses of the volatile memory 64 and together with the operating system to control access to each address range of the random access memory 64 used by each application program 52 (according to groups assigned to the processes of each application program). The control registers may have logical address memory mapped in a register memory space 65 and access to the control registers of the memory management unit 68 may thereby be limited to the operating system 54 by the memory management unit 68 itself.

Before the first steps of the launch routine 126, a first address range 138 will have been allocated to the operating system 54 to hold the operating system executable, its data memory 140, and memory reserved for socket buffers 142. The write permission of this first address range 138 of data is provided only to the operating system 54 as set by the operating system.

As noted, the address ranges of each of the application programs 52 are also reserved at process block 148. The present invention reserves only a predetermined fixed address range 152 to each application program 52 determined from the configuration file and this reservation process starts with Type-C applications identified from the configuration table 94. Each reserved address range 152 must hold the object file 154 of the application program 52 itself (holding instructions for execution) and data space within the reserved address range 152 is allocated as needed by the application as will be described below. Permissions for an application's reserved address range 152 are set, as noted above, so that application programs 52 cannot write outside of the unique address ranges 152 holding their executables 88, preventing interference between applications and, for example, detrimental overwriting of application data of a Type-C application by a Type-A/B application. If insufficient memory exists to guarantee that all Type-C applications can be granted their maximum reserved amount of memory per the configuration file 84 then a Type A/B application program 52 subsequently requiring more memory to be reserved will not be launched and an error annunciated and logged.

In order to ensure that Type A/B applications cannot later allocate the memory required for the proper operation of Type C applications, all limits for Type C applications will be evaluated and the Type C applications launched first. The remaining memory will be available for Type A/B applications. If the configured limit for a Type A/B application exceeds what is available after all Type C applications have been evaluated, the application will not be launched. This evaluation is performed using the maximum limits specified in the design approved configuration file, not the current amount of memory in use by the Type C applications.

As is understood in art, socket buffers 142 may be used to provide for network-like communication on actual networks (e.g. network 45) or between application processes where the socket buffers 142 provide for storage of data being sent between network points or applications to be accessed by different programs or devices. Because socket buffer 142 is held in the first address range 138 of the operating system 54, misuse of socket memory (e.g., if too many sockets are opened or the sockets are too large) could interfere with the operation of the system.

Referring also to FIG. 4, at process block 156, the socket buffers 142 required by each application program 52 are reserved within the first address range 138. In order to prevent possible over allocation of the address range 138 by socket buffers 142, such as could influence the operation of the operating system 54 or its applications programs 52, the present invention limits both the total number of socket buffers 142 and their maximum size to predetermined values obtained from the configuration data 84. In this way it can be assured that socket buffers 142 do not overrun the available memory space by ensuring that address range 138 can hold this predetermined total number of sockets of predetermined maximum size. In practice, a structure associated with each application 52 stored in operating system memory is checked when an application process requests a socket connection. If this request would push socket memory past the boundary, the request would be denied by the operating system 54.

At process block 160, each of the video buffers 158 described above is reserved in the memory range assigned to the operating system 138 for applications requiring access to the display system 26.

Once each application program 52 has been launched and the necessary volatile memory 64 reserved, the operating system 54 may schedule per process block 162 processes for each of the application programs 52, such processes which may be scheduled by the operating system scheduler as will now be described.

Figure 9:
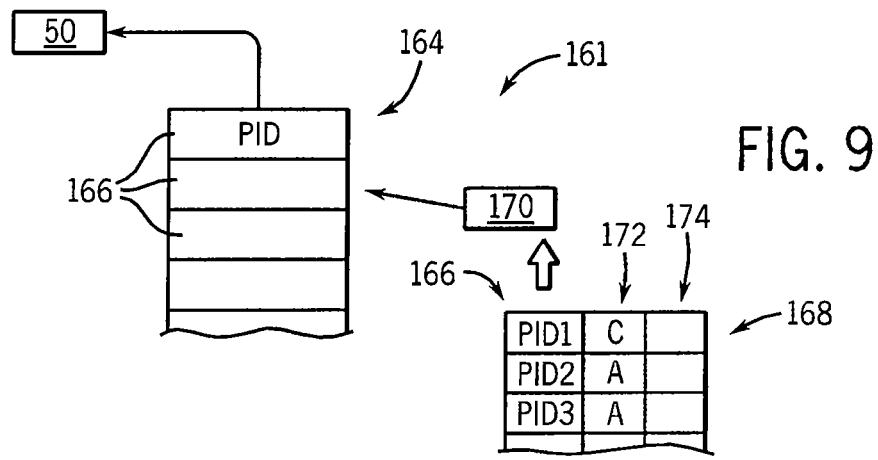
FIG. 9 is a simplified diagram of a processor scheduling system used in the present invention for queuing application processes.

Referring now to FIG. 9, the operating system scheduler 161 may provide a schedule queue 164 holding process identifiers 166 for processes spawned by the application programs 52. These processes will be executed by the processor 50 according to a time slice system, for example, in which each process can have up to a pre-determined maximum amount of processor time before a next process is executed. Processes that are not fully executed are returned to a process table 168 holding all processes that are pending. The process table 168 also holds processes that are spawned by other processes.

Depicted logically, the process table 168 provides a set of rows each representing a process to be scheduled by a scheduler engine 170 for placement in the queue 164 for execution by the processor 50 in queue order. Each row includes a process identification number 166, the type of the underlying application 172 (e.g. Type-C), and a recent execution history of the process 174. The scheduler engine 170 operates to schedule any Type-C in the table 168 before Type-A/B applications and further operates to give higher priority to processes that did not use their entire time slice in the previous schedule opportunity as indicated by the history of the process 174.

Thus the scheduler engine 170 uses a penalty system to "punish" applications 52 that have previously hogged the CPU which pushes them further back in the task queue, forcing them to wait longer to gain access to the CPU. By penalizing applications that always use the maximum amount of allotted time on the CPU, the kernel forces them to the end of the task queue ensuring that every process has access to the CPU and by appropriately setting the maximum allowable CPU time in the configuration file proper application priority can be controlled.

Figure 7:
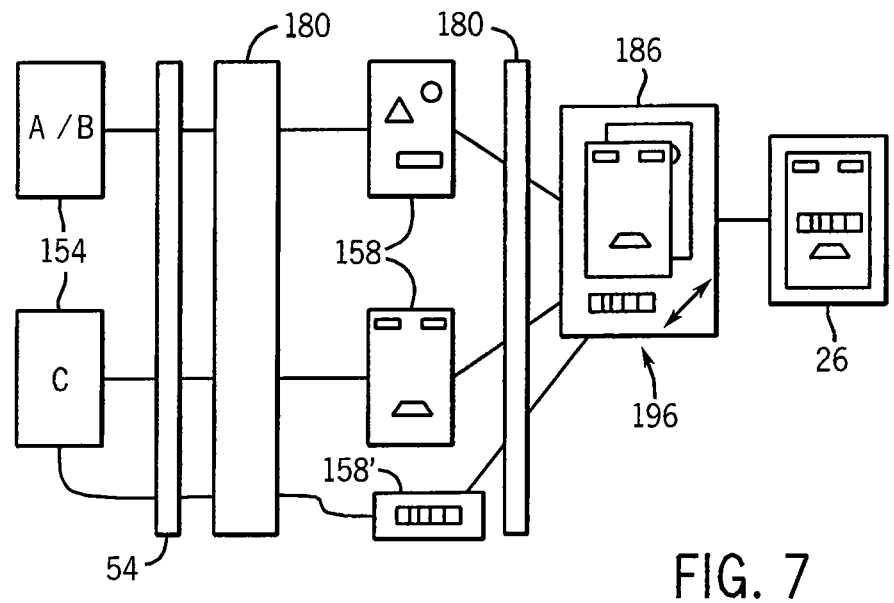
FIG. 7 is a representation of multiple video buffers used by different executing applications as combined by a graphic compositor to provide a display for the electronic flight bag.

Referring now to FIGS. 6 and 7, each application program 52 represented by object file 154 is provided with a separate local graphics buffer 158 by the operating system 54. This graphics buffer 158 includes memory used to store state information and common global constructs (textures, fonts, etc.) and a frame buffer, which may hold a rendering for output to the display screen 26 sufficient to fully describe a visual image on the area of the display screen 26. One or more conventional graphic processor unit 180 may process graphic calls to the operating system 54 to produce separate fully rendered screen maps in the frame buffer portions of the graphics buffer 158 providing pixel values mapping on a one-to-one basis to the display screen 26. These screen maps may then be combined by the graphic processor 180 into a screen buffer by a compositing process that selects among data of the graphics buffers 158 (according to focus information provided by the operating system 54) to display data of one of the graphics buffers 158 on the display screen 26. This process preserves the underlying graphics data of each application 154 so that it is not lost with change of focus and importantly so that an errant Type-A/B application cannot destroy the data of a Type C application in a way that cannot be reversed by the operating system 54.

The operating system 54 creates an overlay graphics buffer 158' which during the compositing process is always placed "in front" of the graphic information from the graphics buffers 158. This data in the overlay graphics buffer 158' is always front-most and/or may make use of transparency parameters. This overlay can be used to annunciate high-priority system information (warnings, notifications, etc.), such as may be generated by Type C applications, as well as provide global system interfaces such as touch screen keyboards, number pads or navigational buttons.

Figure 8:
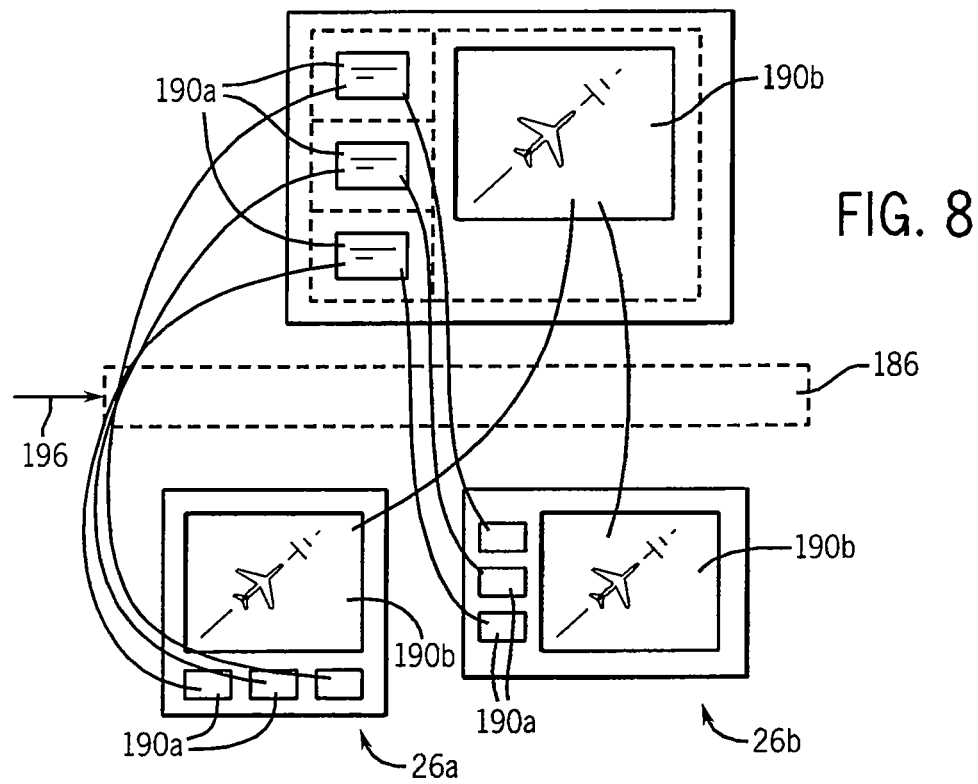
FIG. 8 is a representation of an application template supporting two display orientations with a single binary application.

Referring also to FIG. 8, each graphics buffer 158 may be divided into different functional regions 190 (here depicted as holding images but also possibly holding higher level graphical instructions). The functional regions 190 are such as to separate data that may be positioned independently on the display screen 26. The graphic compositor 186 may accept a screen position command 196 indicating this orientation of the display screen either in portrait mode depicted by display screen 26a or landscape mode depicted by display screen 26b, the latter being arranged with the longest dimension horizontally and the former with the longest dimension vertically. Based on this screen position command 196, provided for example from a setting in the configuration table 94, graphic compositor 186 will change the spatial location of the functional regions 190 to provide the best display arrangement. Thus, for example, functional regions 190 may include functional regions 190a describing touch screen buttons and the functional regions 190b describing a graphic output image. For the landscape display screen 26b, the images of the buttons derived from functional regions 190a may be placed to the side of the graphic output image derived from functional region 190b, while with the portrait display screen 26a, the images of the buttons derived from functional regions 190a may be placed below the graphic output image derived from functional region 190b. In this way, the separate screen layouts need not be hardcoded into the graphics buffer 158.

Alternatively, it will be understood that the functionally identical result may be provided by employing a graphic library that uses knowledge about the orientation of the screen to automatically adjust the position of graphical elements required by the application.

Figure 11:
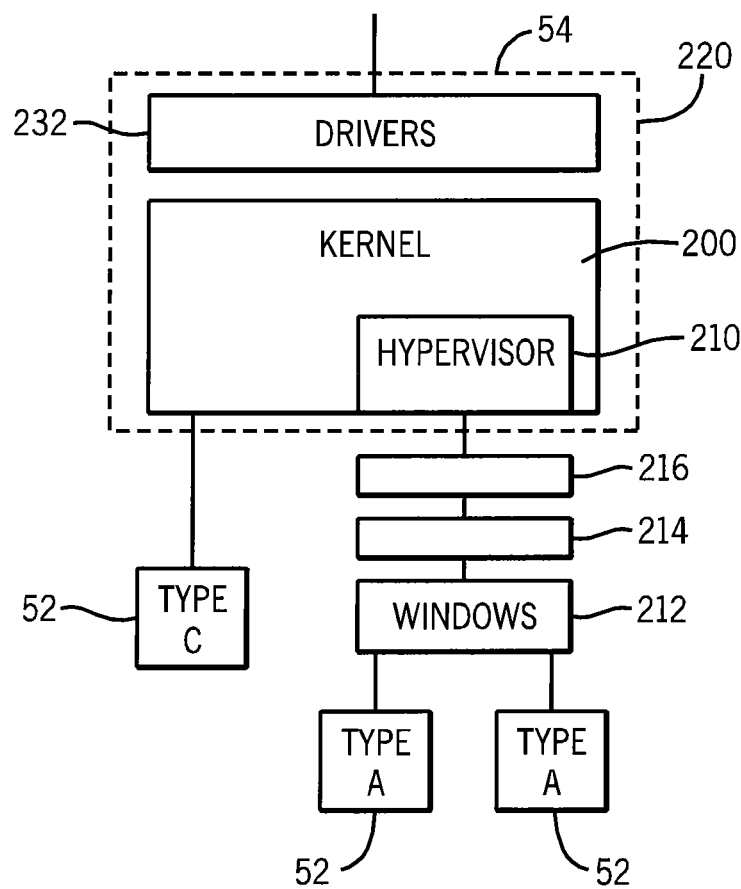
FIG. 11 is a diagram of virtualization that may be implemented by the present invention.

Referring now to FIG. 11, the ability to use a single processor 50 to run multiple application programs 52 having different certification levels may be extended to allow the single processor 50 and operating system 54 to run a second operating system 212 through virtualization. This virtualization allows some of the application programs 52 to execute on a different operating system 212 than the design-approved operating system 54. Thus, for example, the modifications described above may be with respect to design-approved Linux based applications and yet some of the Type-A/B applications can be native to the Windows® operating system 212 by executing the Windows® operating system 212 as an effective application by the Linux operating system 54.

In this embodiment, a design approved Linux-based kernel 200 of operating system 54 may incorporate a virtualizer such as a Hypervisor 210 permitting the execution of a guest operating system 212, typically a COTS operating system such as the Windows® operating system. The Hypervisor 210 presents a virtual hardware platform to the guest operating system 212 allowing the latter to run Type-A and Type-B application programs 52 intended for the Windows® operating system. The Linux kernel 200 may directly execute Type-C application programs 52.

As is understood in the art, the Hypervisor 210 provides an interface to real hardware through virtual device drivers 214 installed on the COTS operating system and a virtualization layer 216 to create an appearance to the COTS operating system 212 of an actual physical machine, that is, a processor, memory, and hardware. Yet the operation of the virtual machine is controlled by the Hypervisor 210 and the operating system 54 as modified above, to constrain the use by the COTS operating system 212 and its application programs 52 of actual physical resources of processor 50 and memory system 62 and to be subservient to the design-approved operating system 54. The virtual machine is treated as if it (the collection of the COTS operating system, the drivers and applications hosted there) were a Type A/B application in its own right. The Windows® operating system 212 maybe given its own partition like any other application program 52 in nonvolatile memory 66 and volatile memory 64 and may be subject to other constraints described above with respect to conventional application In this environment, the Type-C application program 52 may be executed directly on the design approved operating system 54 and thus may be given priority in terms of resources including processor time and display space.

Virtualization can provide a loss in performance, particularly with respect to graphics operations that may be implemented, at least in part, in software or extensively translated in a virtualized environment. For this reason, the present invention contemplates a tunneling 220 between the virtual device drivers to hardware drivers 232 of the operating system 54. This tunneling 220 may be implemented by modification of the COTS operating system 212 to avoid the virtual device drivers 214 and virtualization layer 216 and provide commands through the kernel 200 directly to actual hardware drivers 232. In this way, the delay of working through the virtualization layer 216 and Hypervisor 210 is eliminated as well as delay that can occur when graphics commands are implemented in software through virtualization rather than directly by hardware of the video controller 24.

The risk of this tunneling upsetting the priority of Type-C applications over Type A/B applications is controlled by allowing the operating system 54 to switch the tunneling 220 on and off, for example, by directing the drivers 232 between different command buffers, one used by the virtual device drivers 214 and the tunneling 220, and one used by application programs 52 hosted on the design approved operating system 54.

Additional performance gains can be obtained by using a greatly simplified COTS operating system removing support, for example, for hardware components not implemented in the electronic flight bag 10'.

Additional performance gains may be obtained by running different sets of application programs 52 through multiple different COTS operating systems 212 (not shown). The use of different virtual machines permit each virtual machine to be "tuned" to the type of application programs 52 that they will execute by changing the resources allocated to each virtual machine represented by a different operating system 212. For example, memory intensive application programs 52 may be executed on a virtual machine given proportionally more memory; computationally intensive applications may be executed on a virtual machine 64a given a greater processor resource. Similarly, hardware resources such as network access and the like can be so adjusted. In this way, resources may be better allocated reducing the performance loss from virtualization. For example, additional memory can improve process speed disproportionately, providing that memory to given virtual machines can effect an efficiency improvement over a simple even division of memory among virtual machines. This sort of tailoring is possible because of the closed hardware environment of the electronic flight bag 10'.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An avionics computing system comprising:
a single processor having at least one core;
an electronic memory system communicating with the processor and holding an operating system;
a network interface communicating with an aircraft data network to connect to other aircraft equipment including navigation systems;
a display communicating with the processor;
wherein the operating system executes solely on the single processor to:
load application into the electronic memory system together with configuration data indicating an application type of the applications being of Type-A, T e-B and Type-C;
limit access of Type-A/B applications in the electronic memory system to the electronic memory, the display, and the processor according to predefined rules enforced by the operating system to block potential interference by an execution of the Type-A/B application with an execution of a Type-C application;
wherein the Type-C application is design-approved to interact with the aircraft data network and the Type-A/B application is not design-approved to interact with the aircraft data network;
wherein the operating system further executes solely on the single processor to read data from different buffers written to by both Type-C and Type-A/B applications and to identify the application type of the application writing to each given buffer from the configuration data of the application type and use that identification to composite and write the buffer data to the display so that data from a Type-C application cannot be occluded on at least a portion of the display by data from a Type-A/B application and so that at least a portion of data from a Type-C can be simultaneously viewed on the display with data from a Type-A/B application.

2. The avionics computing system of claim 1 wherein the operating system limits a total size of socket buffers used for communication.

3. The avionics computing system of claim 2 wherein the total size of socket buffers is limited by a predefined maximum data allocation per socket and a predefined maximum number of sockets.

4. The avionics computing system of claim 1 wherein network broadcast messages are prohibited.

5. The avionics computing system of claim 1 wherein electronic memory system includes nonvolatile data storage and wherein each application is assigned to a partition having read and execute but not write permission.

6. The avionics computing system of claim 1 wherein the electronic memory system includes a volatile data storage and wherein each Type-A/B application is reserved volatile data storage only after all Type-C applications have been reserved volatile data storage.

7. The avionics computing system of claim 6 wherein a reservation of volatile data storage is limited to a predefined maximum amount of storage per application.

8. The avionics computing system of claim 7 wherein the reservation of volatile data storage is limited to a predefined total maximum amount of storage for all applications.

9. The avionics computing system of claim 7 wherein the operating system enforces the predefined total maximum and a predefined maximum per application by loading registers in a memory management unit controlling access to the volatile data storage.

10. The avionics computing system of claim 1 wherein the operating system controls scheduling of the single processor for execution of different processes of the applications and provides a schedule percentage for each application limiting execution of each application on the single processor according to that schedule percentage.

11. The avionics computing system of claim 10 wherein the different processes of the applications are queued for the single processor such that processes for Type-C applications are given priority in the queue.

12. The avionics computing system of claim 11 wherein the processes are placed lower in the queue when they historically use their full schedule percentage as compared to when they historically do not use their full schedule percentage.

13. The avionics computing system of claim 1 further including peripheral devices having configuration registers and wherein the operating system blocks access to these registers to Type-A/B applications.

14. The avionics computing system of claim 1 wherein the operating system executes on the single processor to provide data to the display, the operating system managing a separate buffer for each of at least one Type-C and each of at least one Type-A/B application and selecting between the buffers by operating system control so that the Type-A/B application cannot overwrite data of the buffer for the Type-C application.

15. The avionics computing system of claim 14 wherein separate buffers are in memory locations writable by a single application.

16. The avionics computing system of claim 14 wherein the buffers are partitioned into functional areas and wherein a display system rearranges a relationship between buffer location and spatial locations on the display differently for different functional areas depending on an indicated orientation of the display.

17. The avionics computing system of claim 1 wherein the operating system executes on the single processor to provide data to the display, the operating system managing an application buffer receiving standard display data from an application and an overlay buffer receiving higher priority display data from a Type-C application, the operating system compositing contents of the buffers so that the application buffer cannot occlude data from the overlay buffer when displayed.

18. The avionics computing system of claim 1 wherein electronic memory system also holds a second operating system and wherein the Type-A/B application is executed by the second operating system by virtualization implemented by the operating system.

19. The avionics computing system of claim 18 wherein the operating system executes the second operating system as it does a Type-A/B application.

20. The avionics computing system of claim 18 wherein the operating system limits the access of the second operating system to the electronic memory, the display, and the processor according to predefined rules enforced by the operating system to block potential interference by an execution of the second operating system with an execution of the Type-C applications.

21. The avionics computing system of claim 20 wherein the second operating system a commercial-off-the-shelf operating system not design-approved to interact with the aircraft data network.

22. The avionics computing system of claim 18 wherein the operating system is a design approved operating system and the second operating system is a non-design approved operating system.

* * * * *

UNITED STATES PATENT AND TRADEMARK OFFICE
CERTIFICATE OF CORRECTION

| | | |
|---|---|---|
| PATENT NO. | : 9,223,633 B2 | Page 1 of 1 |
| APPLICATION NO. | : 13/120372 | |
| DATED | : December 29, 2015 | |
| INVENTOR(S) | : Shuler et al. | |

It is certified that error appears in the above-identified patent and that said Letters Patent is hereby corrected as shown below:

<u>IN THE CLAIMS</u>

CLAIM 1, Col. 13, Line 23

Delete "Type-A, Te-B" and substitute therefor

--Type-A, Type-B--

Signed and Sealed this
Seventh Day of June, 2016

Michelle K. Lee
*Director of the United States Patent and Trademark Office*